United States Patent Office 3,585,205
Patented June 15, 1971

3,585,205
THIONOPHOSPHONIC ACID ESTERS OF SUBSTI-
TUTED 2-HYDROXY-3-CYANO-6-PYRIDINES
Karl-Julius Schmidt, Wuppertal-Vohwinkel, Christa Fest,
Wuppertal-Elberfeld, and Ingeborg Hammann, Cologne,
Germany, assignors to Farbenfabriken Bayer Aktien-
gesellschaft, Leverkusen, Germany
No Drawing. Filed July 17, 1968, Ser. No. 745,394
Claims priority, application Germany, July 26, 1967,
F 53,058
Int. Cl. C07d 31/50
U.S. Cl. 260—294.8                  6 Claims

ABSTRACT OF THE DISCLOSURE

Thionophosphonic acid esters of substituted 2-hydroxy-2-hydroxy-3-cyano- and -3-carbamyl-pyridines which have cidal properties. The pyridine may be substituted in 4-position with a methoxy-methyl, ethoxy-methyl, carbethoxy or methyl radical and in 5-position with chlorine or bromine. The thionophosphonic acid moiety carries $C_{1-3}$ radical directly bound to the phosphorus and another connected thereto through an oxygen atom.

The following invention relates to new phosphoric and thionophosphoric (phosphonic) acid esters of substituted 2-hydroxy-3-cyano- and -3-carbamyl-jyridines which have insecticidal and acaricidal properties, and to a process for the production of the aforesaid compounds.

From U.S. patent specification No. 3,284,455 there are known phosphonic and thionophosphonic acid quinolyl esters. These products are obtained by reaction of alkyl or aryl(thiono) phosphonic acid-O-alkyl ester halides with the appropriate hydroxy quinolines.

According to the information given in the aforesaid patent specification, these compounds are distinguished by good insecticidal and acaricidal properties and are, therefore, suitable for the control of aphids, spider mites, flies, ticks etc.

Furthermore, German patent specification No. 925,270 describes dialkylthiol- and -thionothiolphosphoric acid-S-(benzazimido-methyl) esters which possess a good activity against sucking and eating insects, in particular against spider mites. These products can, therefore, be used as pesticides.

In accordance with the present invention it has now been found that phosphoric and thionophosphoric (phosphonic) acid pyridyl-(2) esters of the general formula

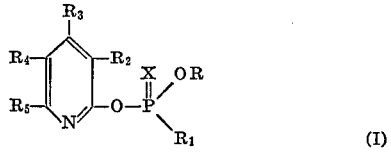

(I)

can be obtained in a smooth reaction and in very good yields by reacting appropriately 2-hydroxy-3-cyano- or -3-carbamyl-pyridines of the formula

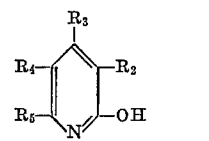

(II)

with phosphoric, phosphonic or thionophosphoric (phosphonic) acid ester halides of the formula

(III)

In the aforesaid formulae, R and $R_1$ stand for lower alkyl radicals with 1 to 4 carbon atoms, $R_1$ may also represent a lower alkoxy radical or a phenyl radical, $R_2$ stands for a cyano or carbamyl group, $R_3$ is the phenyl, a lower carbalkoxy, alkyl or alkoxymethyl radical, $R_4$ is a hydrogen or a halogen atom, $R_5$ is a lower alkyl radical and X is an oxygen or a sulphur atom and Hal is a halogen atom.

The products of the Formula I exhibit outstanding insecticidal and acaricidal properties. They possess an excellent activity against both biting and sucking insects. In this respect the new compounds according to the invention are clearly superior to the known compounds of analogous constitution and the same direction of activity; the former represent a genuine enrichment of the art .

The process of the invention proceeds in the sense of the following formula scheme

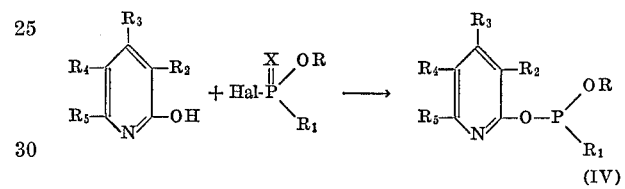

(IV)

In the aforesaid equation, the symbols R. $R_1$ to $R_5$, X and Hal have the meaning stated eariler above.

R is preferably a lower alkyl radical with 1 to 3 carbon atoms such as a methyl, ethyl, n-propyl or isopropyl racidal, $R_1$ is preferably a radical OR or a methyl, ethyl, n- and isopropyl group or the phenyl radical, $R_2$ is preferably the cyano group, $R_3$ is the methoxymethyl, ethoxymethyl, carbethoxyphenyl or methyl group, $R_4$ is a hydrogen, chlorine or bromine atom and $R_5$ is the methyl group; X is preferably a sulphur atom and Hal a chlorine atom.

The 2-hydroxy - 3 - cyano and -carbamyl-pyridines of the Formula II which are required as starting material for the herein described process, can be prepared according to methods which are known in the literature, from the corresponding 1,3-diketones, by condensation thereof with cyano-acetamide and optionally by subsequent halogenation and/or hydrolysis with strong mineral acids, i.e. sulfuric acid, i.e. sulfuric acid according to the following scheme:

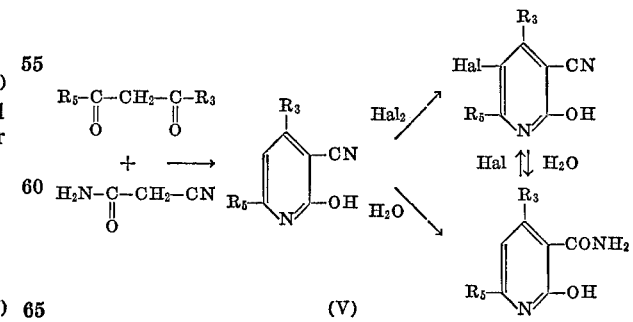

(V)

In the aforesaid equation, the symbols $R_3$, $R_5$ and Hal have the meaning stated earlier above.

The reaction of the invention is preferably carried out in the presence of an inert solvent (this term includes mere diluents). For this purpose there may be used practically all inert organic solvents or mixtures thereof, such as hydrocarbons, for example benzine, benzene, toluene, chlorobenzene and xylene, ethers, for example diethyl and dibutyl ether, dioxan, and ketones, for example acetone, methylethyl ketone, methylisopropyl ketone and methylisobutyl ketone. Particularly good results have been obtained with low-boiling aliphatic alcohols, for example methanol and ethanol, nitriles, for example acetonitrile and propionitrile, and dimethyl formamide.

The reaction of the invention is preferably carried out in the presence of an acid-binding agent. For this purpose, practically all customary acid-binding agents may be used. Alkali metal alcoholates and carbonates, such as potassium and sodium methylate or ethylate and sodium and potassium carbonate and tertiary aromatic or heterocyclic amines, such as triethylamine, dimethylaniline and pyridine, have proved particularly suitable.

The reaction temperature can be varied within a fairly wide range. In general, the work is carried out at from 20 to 120° C. (or the boiling point of the mixture), preferably at 40 to 80° C.

The starting materials for the reaction, as well as any auxiliary substances (acid-binding agents) are, in general, used in stoichiometric amounts.

After combining the starting components, it is advantageous to continue heating the mixture for a longer period (about 1 to 3 hours—optionally with stirring) in order to complete the reaction. With this method of working, the compounds of the invention are obtained with outstanding yields as well as with excellent purity.

Most of the new phosphoric and thionophosphoric (phosphonic) acid esters of 2-hydroxy-3-cyano-pyridines and -3-carbamyl-pyridines are obtained in the process as colourless crystals with sharp melting point which can, if necessary, readily be further purified by recrystallisation from the usual solvents; in most cases, however, the products are obtained in the form of colourless to yellow-coloured, viscous, water-insoluble oils which cannot be distilled without decomposition, but which can be freed from any remaining volatile components by so-called "slight distillation," i.e. by longer heating to moderately elevated temperatures under reduced pressure, and can in this way be purified. For their more exact characterisation, determination of the refractive index can be used.

As already mentioned above, the new active compounds are distinguished by outstanding insecticidal and acaricidal effectiveness. The action commences rapidly and is long-lasting. At the same time they have only a slight toxicity to warm-blooded animals and a slight phytotoxicity. For this reason, the compounds of the invention can be used with success in plant protection for the control of noxious sucking and biting insects and Diptera as well as in the veterinary-medical field against mites (Acarina). Particularly to be emphasized in this connection is the excellent effectiveness of the new products against phosphoric acid ester-resistant strains of spider mites.

To the sucking insects there belong, in the main, aphids (Aphidae) such as the green peach aphid (*Myzus persicae*), the bean aphid (*Doralis fabae*), the bird cherry aphid (*Rhopalosiphum padi.*), the pea aphid (*Macrosiphum pisi*) and the potato aphid (*Macrosiphum solanifolii*), the current gall aphid (*Cryptomyzus korschelti*), the mealy apple aphid (*Sappaphis mali*), the mealy plum aphid (*Hyalopterus arundinis*) and the cherry black-fly (*Myzus cerasi*); also scales and mealybugs (*Coccina*), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius proiixus*) and Chagas' bug (*Triatoma infestans*) and cicadas, such as *Euscelis bilobatus* and *Nephotettix bipunctatus*.

In the case of the biting insects, there should particularly be mentioned butterfly caterpillars (Lepidoptera) such as the diamond-back moth (*Plutella maculipennis*), the gipsy moth (*Lymantria dispar*), the brown-tail moth (*Euproctis chrysorrhoea*), the tent caterpillar (*Malacosoma neustria*), the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) the cotton worm (*Prodenia litura*), the ermine moth (*Hyponomeuta padella*), the Mediterranean flour moth (*Ephestia Kühniella*) and the greater wax moth (*Galleria mellonella*). Also to be classed with the bitting insects are beetles (Coleoptera), for example the granary weevil (*Sitophilus granarius-Calandra granaria*), the Colorado bettle (*Leptinotarsa decemlineata*), the deck bettle, *Gastrophysa viridula*), the mustard beetle (*Phaedon cochleariae*), the blossom beetle (*Meligethes aeneus*), the raspberry bettle (*Byturus tomentosus*), the bean weevil (*Bruchidius-Acanthoscelides obtectus*), the leather beetle (*Dermestes frischi*), the khapra beetle (*Trogoderma granarium*), the flour beetle (*Tribolium castaneum*), the northern corn billbug (Calandra or *Sitophilus zeamais*), the drugstore beetle (*Stegobium paniceum*), the yellow mealworm (*Tenebrio molitor*) and the saw-toothed grain beetle (*Oryzaephilus surinamensis*), as well as species living in the soil, for example wireworms (Agriotes spec.) and larvae of the cockchafer (*Melolontha melolentha*), cockroaches, such as the German cockroach (*Blatella germanica*), America cockroach (*Periplaneta americana*), Madeira cockroach (Laucophaea or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta*, Orthoptera, for example the house cricket (*Gryllus domesticus*) termites such as the eastern sub terranean termite (*Reticulitermes flavipes*) and Hymenoptera such as ants, for example the garden ant (*Lasius niger*).

The Diptera comprise essentially the flies, such the vinegar fly (*Drosophila melanogaster*) the Mediterranean fruit fly (*Ceratitis capitata*), the house fly (*Musca domestica*), the little housefly (*Fannia canicularis*), the black blow fly (*Phormia aegina*), the bluebottle fly (*Calliphora erythrocephala*) and the stable fly (*Stomoxys calcitrans*); as well as gnats, for example mosquitoes such as the yellow fever mosquito (*Aedes aegypti*), the northern house mosquito (*Culex pipiens*) and the malaria mosquito (*Anopheles stephensi*).

With the mites (Acari) there are classed, in particular, the spider mite (Tetranychidae) such as the two-spotted spider mite. (*Tetranychus telarius-Tetranychus althaeae* or *Tetranychus urticate*) and the European red mite (*Paratetranychus pilosus-Panonychus ulmi*), blister mites, for example the currant blister mite (*Eriophyes ribis*) and tarscnemids, for example the broad mite (*Hemitarsonemus latus* and the cyclamen mite (*Tarsonemus pallidus*), and ticks, such as the relapsing fever tick (*Ornithodorus moubata*).

When used against hygiene pests and pests of stored goods, especially flies and gnats, the new active compounds are further distinguished by an outstanding residual activity on wood and clay, as well as a good stability to alkali on limed substrates.

The active compounds of the present invention can be converted into the usual formulations, such as solutions, emulsions, suspensions, powders, pastes, and granulates. These may be produced in known manner, for example by mixing the active compounds with extenders, that is liquid or solid diluents or carriers, optionally with the use of surface-active agents, that is, emulsifying agents and/or dispersing agents. In the case of the use of water as an extender, organic solvents can, for example, also be used as auxiliary solvents.

As liquid diluents or carriers, there are preferably used aromatic hydrocarbons, such as xylenes or benzene, chlorinated aromatic hydrocarbons, such as chlorobenzenes, paraffins, such as mineral oil fractions, alcohols, such as methanol or butanol, or strongly polar solvents, such as dimethyl formamide or dimethyl sulphoxide, as well as water.

As solid diluents or carriers, there are preferably used ground natural minerals, such as kaolins, clays, talc or chalk, or ground synthetic minerals, such as highly-dispersed silicic acid or silicates.

Preferred examples, of emulsifying agents include non-ionic and anionic emulsifiers, such as polyoxyethylene-fatty acid esters, polyoxyethylene-fatty alcohol ethers, for example alkylarylpolyglycol ethers, alkyl sulphonates and aryl sulphonates; and preferred examples of dispersing agents include lignin, sulphite waste liquors and methyl cellulose.

The active compounds of the invention may be present in the formulations in admixture with other active compounds.

The formulations contain, in general, from 0.1 to 95, preferably from 0.5 to 90, percent by weight of active compound.

The concentrations of active compound for actual application can be varied within a fairly wide range. In general, concentrations of 0.00001% to 20%, preferably of 0.01% to 5% are used.

The active compounds may be used as such or in the form of their formulations or of the application forms prepared therefrom, such as ready-to-use solutions, emulsifiable concentrates, emulsions, suspensions, spray powders, pastes, soluble powders, dusting agents and granulates. Application may take place in the usual manner, for example, by watering, spraying, atomising, fumigation, scattering, dusting or vaporisation.

Surprisingly, the compounds of the invention are distinguished from the active compounds (of analogous constitution and the same direction of activity) known from the literature by an essentially better effectiveness with considerably lower toxicity to warmblooded animals. They, therefore, represent a genuine enrichment of the art. This unexpected superiority of the compounds of the invention as well as their outstanding activity when used against a multiplicity of pests and animal parasites can be seen from the following experimental results:

EXAMPLE A

Plutella test

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dew moist, and are then infested with caterpillars of the diamond-back moth (*Plutella maculipennis*).

After the specified periods of time, the degree of destruction is determined as a percentage: 100% means that all the caterpillars are killed, whereas 0% means that none are killed.

The active compounds, their concentrations, the evaluation times and the results obtained can be seen from the following Table 1:

TABLE 1

| Active compound (constitution) | Concentration of active compound in percent | Degree of destruction after 3 days in percent |
|---|---|---|
| (CH$_3$)(C$_2$H$_5$O)P(=S)–O–(8-quinolinyl) (known comparative compound) | 0.1<br>0.01 | 100<br>20 |
| (C$_2$H$_5$O)(C$_6$H$_5$)P(=S)–O–[3-CN-4-CH$_3$-6-CH$_3$-pyridin-2-yl] | 0.1<br>0.01 | 100<br>100 |
| (C$_2$H$_5$O)(CH$_3$)P(=S)–O–[3-CN-4-CH$_3$-5-Cl-6-CH$_3$-pyridin-2-yl] | 0.1<br>0.01<br>0.001 | 100<br>100<br>100 |
| (C$_2$H$_5$O)(C$_2$H$_5$)P(=S)–O–[3-CN-4-CH$_3$-5-Cl-6-CH$_3$-pyridin-2-yl] | 0.1<br>0.01<br>0.001<br>0.0001 | 100<br>100<br>100<br>20 |
| (C$_2$H$_5$O)(C$_6$H$_5$)P(=S)–O–[3-CN-4-CH$_3$-5-Br-6-CH$_3$-pyridin-2-yl] | 0.1<br>0.01 | 100<br>90 |
| (C$_2$H$_5$O)(CH$_3$)P(=S)–O–[3-CN-4-CH$_3$-5-Br-6-CH$_3$-pyridin-2-yl] | 0.1<br>0.01<br>0.001 | 100<br>100<br>90 |
| (C$_2$H$_5$O)(C$_6$H$_5$)P(=S)–O–[3-CN-4-(CH$_2$–OC$_2$H$_5$)-6-CH$_3$-pyridin-2-yl] | 0.1<br>0.01 | 100<br>100 |
| (C$_2$H$_5$O)(CH$_3$)P(=S)–O–[3-CN-4-(CH$_2$–OC$_2$H$_5$)-6-CH$_3$-pyridin-2-yl] | 0.1<br>0.01<br>0.001 | 100<br>100<br>90 |
| (C$_2$H$_5$O)$_2$P(=O)–O–[3-CN-4-COOC$_2$H$_5$-6-CH$_3$-pyridin-2-yl] | 0.1<br>0.01 | 100<br>100 |
| (C$_2$H$_5$O)(CH$_3$)P(=S)–O–[3-CN-4-COOC$_2$H$_5$-6-CH$_3$-pyridin-2-yl] | 0.1<br>0.01<br>0.001 | 100<br>100<br>80 |

TABLE 1—Continued

| Active compound (constitution) | Concentration of active compound in percent | Degree of destruction after 3 days in percent |
|---|---|---|
| 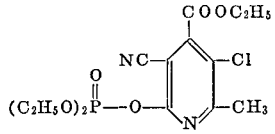 | 0.1<br>0.01 | 100<br>95 |
| 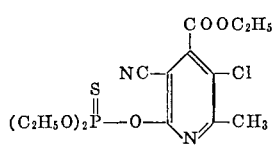 | 0.1<br>0.01 | 100<br>100 |
| 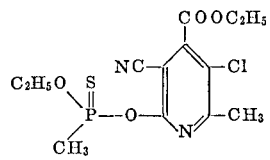 | 0.1<br>0.01<br>0.001 | 100<br>100<br>100 |
| 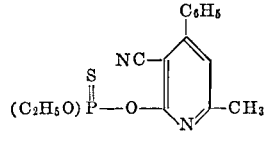 | 0.1<br>0.01 | 100<br>80 |
| 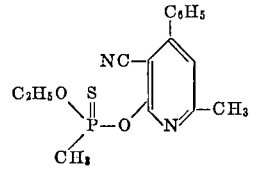 | 0.1<br>0.01 | 100<br>60 |
| 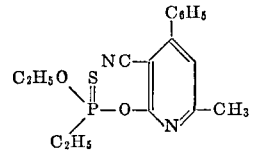 | 0.1<br>0.01<br>0.001 | 100<br>100<br>20 | experimental results obtained can be seen from the following Table 2:

TABLE 2

| Active compound (constitution) | Concentration of active compound in percent | Degree of destruction in percent after 3 days |
|---|---|---|
| 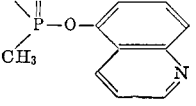<br>(known comparative product) | 0.1<br>0.01 | 100<br>70 |
| 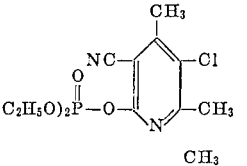 | 0.1<br>0.01<br>0.001 | 100<br>100<br>20 |
| 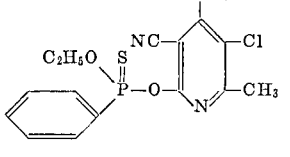 | 0.1<br>0.01<br>0.001 | 100<br>100<br>20 |
| 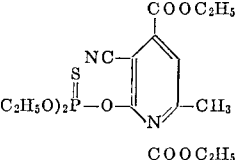 | 0.1<br>0.01 | 100<br>100 |
| 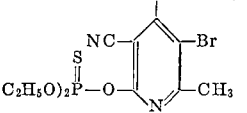 | 0.1<br>0.01 | 100<br>100 |

EXAMPLE B

Phaedon larvae test

Solvent: 3 parts by weight of acetone
Emulsifier: 1 part by weight of alkylaryl polyglycol ether To produce a suitable preparation of active compound, 1 part by weight of the active compound is mixed with the stated amount of solvent containing the above-mentioned amount of emulsifier, and the concentrate thus obtained is diluted with water to the desired concentration.

Cabbage leaves (*Brassica oleracea*) are sprayed with this preparation of the active compound until dripping wet and then infested with mustard beetle larvae (*Phaedon cochleariae*).

After the periods of time stated in the following table, the degree of destruction of the pests is determined and expressed as a percentage: 100% means that all and 0% means that none of the beetle larvae are killed.

The active compounds tested, the concentrations of the active compounds, the times of evaluation and the

EXAMPLE C

Myzus test (contact action)

Solvent: 3 parts by weight of acetone
Emulsifier: 1 part by weight of alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 3:

with the preparation of the active compound until dripping wet.

After the specified periods of time, the degree of destruction is determined as a percentage: 100% means that all the aphids are killed, whereas 0% means that none are killed.

The active compounds, their concentrations, the evaluation times and the results obtained can be seen from the following Table 4:

TABLE 3

| Active compound (constitution) | Concentration of active compound in percent | Degree of destruction in percent after 24 hours |
|---|---|---|
| 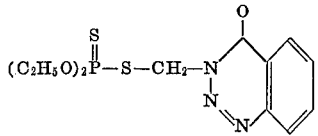 (known comparative product) | 0.1<br>0.01 | 100<br>50 |
| 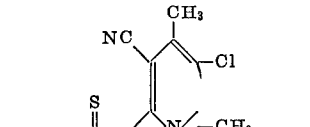 | 0.1<br>0.01 | 100<br>99 |
| 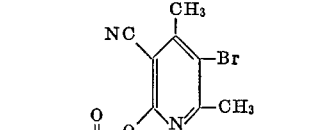 | 0.1<br>0.01<br>0.001 | 100<br>100<br>40 |
| 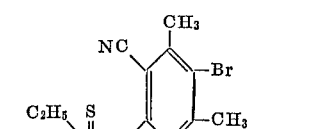 | 0.1<br>0.01<br>0.001 | 100<br>100<br>100 |
| 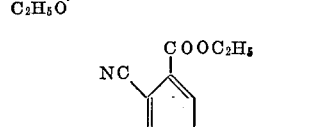 | 0.1<br>0.01<br>0.001<br>0.0001 | 100<br>100<br>90<br>50 |
| 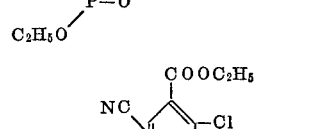 | 0.1<br>0.01<br>0.001 | 100<br>100<br>90 |
| 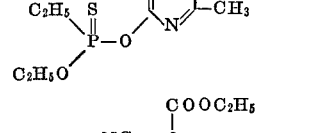 | 0.1<br>0.01<br>0.001 | 100<br>100<br>90 |

TABLE 4

| Active compound (constitution) | Concentration of active compound in percent | Degree of destruction in percent after 24 hours |
|---|---|---|
| 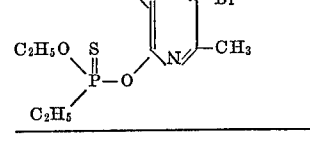 (known comparative compound) | 0.1<br>0.01 | 100<br>40 |
| 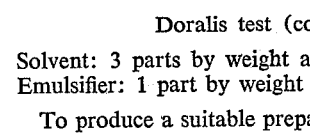 | 0.1<br>0.01<br>0.001<br>0.0001 | 100<br>100<br>98<br>40 |
| 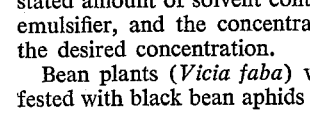 | 0.1<br>0.01<br>0.001<br>0.0001 | 100<br>100<br>90<br>20 |
|  | 0.1<br>0.01<br>0.001<br>0.0001 | 100<br>100<br>95<br>30 |
| 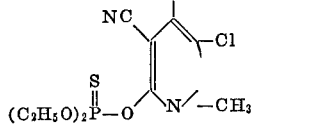 | 0.1<br>0.01<br>0.001 | 100<br>95<br>40 |
| 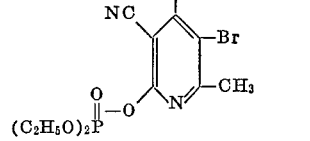 | 0.1<br>0.01<br>0.001 | 100<br>99<br>98 |
| 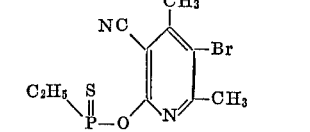 | 0.1<br>0.01<br>0.001 | 100<br>100<br>40 |

EXAMPLE D

Doralis test (contact action)

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier, and the concentrate is diluted with water to the desired concentration.

Bean plants (*Vicia faba*) which have been heavily infested with black bean aphids (*Doralis fabae*) are sprayed

EXAMPLE E

Tetranychus test

Solvent: 3 parts by weight of acetone
Emulsifier: 1 part by weight of alkylaryl polyglycol ether To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus telarius*) in all stages of development.

After the specified periods of time, the effectiveness of the preparation of active compound is determined by counting the dead mites. The degree of destruction thus obtained is expressed as a percentage: 100% means that all the spider mites are killed whereas 0% means, that none of the spider mites are killed.

The active compounds, the concentrations of the active compounds, the evaluation times and the results can be seen from the following Table 5:

TABLE 5

| Active compound (constitution) | Concentration of active compound in percent | Degree of destruction in percent after 48 hours |
|---|---|---|
| 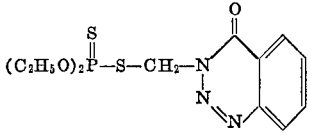 (known comparative compound) | 0.1 / 0.01 | 98 / 0 |
| 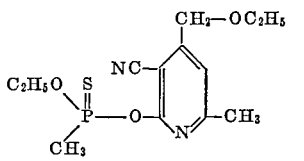 | 0.1 / 0.01 | 100 / 95 |

The following examples are given for the purpose of illustrating the present invention:

EXAMPLE 1

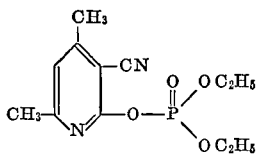

44 g. (0.3 mole) 2-hydroxy-3-cyano-4,6-dimethyl-pyridine are heated under reflux for 30 minutes together with the equimolated quantity of dried, pulverised potassium carbonate in 350 ml. acetonitrile. 52 g. O,O-diethyl-phosphoric acid ester chloride are subsequently added dropwise at 60 to 70° C. to the reaction mixture, which is then stirred for a further 2 hours at the boiling point after the weakly exothermic reaction has subsided. The mixture is then cooled and 500 ml. benzene are added. The soluble constitutions are washed out by shaking several times 1 N potassium hydroxide solution and water, the organic phase is dried over sodium sulfate, the solvent evaporated under reduced pressure, finally by slightly distillation at 70° C. and 0.1 mm. Hg. The raw product can be purified by recrystallization from a mixture of benzene and petroleum and ether. The yield is 43 g. (50% of the theory) O,O-diethylphosphoric acid-O-[3 - cyano-4,6-dimethyl-pyridyl-(2)]-ester in form of white crystals of the melting point 48 to 50° C.

EXAMPLE 2

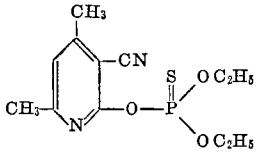

44 g. (0.3 mole) 2-hydroxy-3-cyano-4,6-dimethyl-pyridine are reacted with 57 g. O,O-diethylthionophosphoric acid ester chloride at 75° C. for 3 hours as described in Example 1. The reaction mixture is worked up by taking the same up in ether, washing the ethereal solution with 1 N potassium hydroxide solution and water, drying, evaporation and slightly distillation. 82 g. (90% of the theory) O,O-diethylthionophosphoric acid-O-[3-cyano-4,6-dimethyl-pyridyl-(2)]-ester are obtained as a yellowish oil which can be recovered by recrystallization from benzene-petroleum ether in white crystals of the melting point 46 to 47° C.

*Analysis.*—Calculated for $C_{12}H_{17}N_2O_3PS$ (molecular weight 311): N, 9.33%; P, 10.31%; S, 10.68%. Found: N, 9.56%; P, 10.50%; S, 10.57%.

EXAMPLE 3

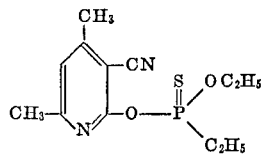

The equimolecular quantity of a sodium methylate solution is added dropwise to a mixture of 44 g. (0.3 mole) 2-hydroxy - 3 - cyano-4,6-dimethylpyridine and 500 ml. dimethylformamide. The reaction is then stirred 15 minutes at 60° C. and concentrated under reduced pressure to about 200 ml., and 52 g. ethylthionophosphonic-acid-O-ethyl ester chloride are added at 50° C.

The mixture is subsequently stirred at 70 to 75° C. for 2 hours and worked up as described in Example 1. The yield is 69 g. (81% of the theory) ethylthionophosphonic-acid - O-ethyl-O-[3-cyano-4,6-dimethyl-pyridyl-(2)]-ester in form of white crystals which melt after recrystallization from mixture of benzene and ligroin at 46 to 47° C.

*Analysis.*—Calculated for $C_{12}H_{17}N_2O_2PS$ (molecular weight 284.3): N, 9.85%; P, 10.90%; S, 11.28%. Found: N, 9.68%; P, 11.31%; S, 11.80%.

EXAMPLE 4

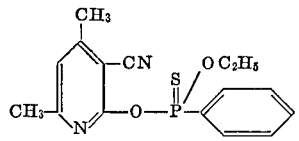

68 g. (68% of the theory) phenylthionophosphonic-acid - O-ethyl-O-[3-cyano-4,6-dimethyl-pyridyl-(2)]-ester (melting point 105° C. after recrystallization from benzene and ligroin) are obtained in a manner analogous to that described in Example 1 from 44 g. (0.3 mole) 2-hydroxy-3-cyano-4,6-dimethyl-pyridine and 66 g. phenylthionophosphonic-acid-O-ethyl ester chloride.

*Analysis.*—Calculated for $C_{16}H_{17}N_2O_2PS$ (molecular weight 332.4): N, 8.43%; P, 9.32%; S, 9.65%. Found: N, 8.36%; P, 9.62%; S, 9.87%.

By the reaction of 2-hydroxy-3-cyano-4,6-dimethyl-5-bromopyridine analogous to Examples 1 to 4 the following compounds can be prepared:

EXAMPLE 5

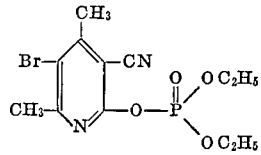

O,O - diethylphosphoric - acid - O-[3-cyano-4,6-dimethyl-5-bromo-pyridyl-(2)]-ester.

The yield is 62% of the theory, the melting point 53 to 55° C.

*Analysis.*—Calculated for $C_{12}H_{16}BrN_2O_4P$ (molecular weight 363.2): Br, 22.01%; N, 7.72%; P, 8.53%. Found: Br, 22.42%; N, 7.66%; P, 8.67%.

EXAMPLE 6

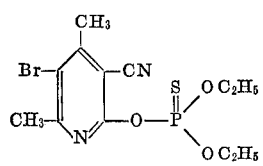

O,O-diethylthionophosphoric-acid-O-[3-cyano-4,6-dimethyl-5-bromopyridyl-(2)]-ester.

Yield: 48% of the theory. Melting point 67 to 68° C.

Analysis.—Calculated for $C_{12}H_{16}BrN_2O_3PS$ (molecular weight 379.2): Br, 21.08%; N, 7.39%; P, 8.17%; S, 8.46%. Found Br, 21.01%; N, 7.49%; P, 8.64%; S, 8.84%.

EXAMPLE 7

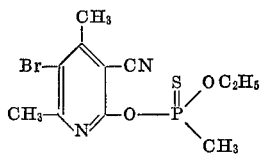

Methylthionophosphonic acid-O-ethyl-O-[3-cyano-4,6-dimethyl-5-bromo-pyridyl-(2)]-ester.

Yield: 50% of theory. Melting point 108 to 109° C.

Analysis.—Calculated for $C_{11}H_{14}BrN_2O_2PS$ (molecular weight 349.2): Br, 22.89%; N, 8.02. Found: Br, 22.57%; N, 7.94%.

EXAMPLE 8

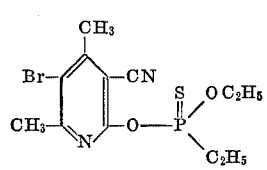

Ethylthionophosphonic-acid-O-ethyl-O-[3-cyano-4,6-dimethyl-5-bromo-pyridyl-(2)]-ester.

Yield: 75% of the theory. Melting point 105° C.

Analysis.—Calculated for $C_{12}H_{16}BrN_2O_2PS$ (molecular weight 363.2): Br, 22.01%; N, 7.72%; P, 8.53%; S, 8.83%. Found: Br, 22.47%; N, 7.78%; P, 8.55%; S, 8.96%.

EXAMPLE 9

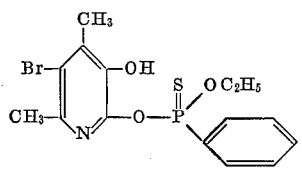

Phenylthionophosphonic-acid-O-ethyl-O-[3-cyano-4,6-dimethyl-5-bromo-pyridyl-(2)]-ester.

Yield: 52% of the theory. Melting point 82 to 83° C.

Analysis.—Calculated for $C_{16}H_{16}BrN_2O_2PS$ (molecular weight 411): Br, 19.43%; N, 6.81%; P, 7.53%; S, 7.79%. Found: Br, 19.61%; N, 6.74%; P, 7.49%; S, 7.93%.

The 2-hydroxy-3-cyano-4,6-dimethyl-5-bromopyridine to be used as starting material according to Examples 5 to 9 can be prepared for example as follows:

74 g. (0.5 mole) 2-hydroxy-3-cyano-4,6-dimethylpyridine are heated in 750 ml. glacial acetic acid to 70° C., 80 g. bromine added to the reaction mixture at the this temperature and a clear solution which is stirred at 70° C. for another 30 minutes and then poured into ice-water. The resulting 2-hydroxy-3-cyano-4,6-dimethyl-5-bromopyridine precipitates as a white crystal paste which is filtered off with suction and recrystallized from aqueous acetic acid.

The yields is 112 g. (98% of the theory). The decomposition point is at 245° C.

By reaction of 2-hydroxy-3-cyano-4,6-dimethyl-5-chloro-pyridine in an analogous manner as described in Examples 1 to 4, the following products can be obtained.

EXAMPLE 10

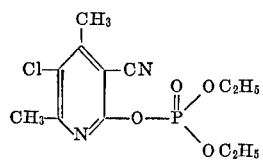

O,O-diethylphosphoric-acid-O-[3-cyano-4,6-dimethyl-5-chloro-pyridyl-(2)]-ester.

Yield: 62% of the theory. Melting point 62° C.

Analysis.—Calculated for $C_{12}H_{16}ClN_2O_4P$ (molecular weight 318.7): Cl, 11.13%; N, 8.79%; P, 9.72%. Found: Cl, 11.03%; N, 8.67%; P, 9.99%.

EXAMPLE 11

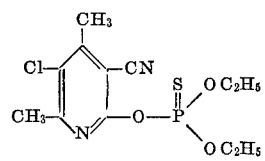

O,O-diethylthionophosphoric-acid-O-[3-cyano-4,6-dimethyl-5-chloro-pyridyl-(2)]-ester.

Yield: 54% of the theory. Melting point 53 to 55° C. (from ethanol).

Analysis.—Calculated for $C_{12}H_{16}ClN_2O_3PS$ (molecular weight 335): Cl, 10.59%; N, 8.37%; P, 9.25%; S, 9.58%. Found: Cl, 10.61%; N, 8.33%; P, 9.40%; S, 9.65%.

EXAMPLE 12

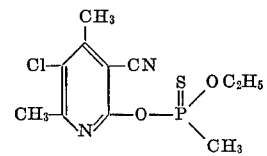

Methylthionophosphonic-acid-O-ethyl-O-[3-cyano-4,6-dimethyl-5-chloro-pyridyl-(2)]-ester.

Yield: 45% of the theory. Melting point 100° C.

Analysis.—Calculated for $C_{11}H_{14}ClN_2O_2PS$ (molecular weight 305): Cl, 11.64%; N, 9.20%; P, 11.17%; S, 10.52%. Found: Cl, 11.77%; N, 9.22%; P, 10.66%; S, 10.95%.

EXAMPLE 13

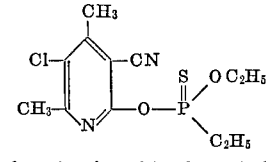

Ethylthionophosphonic-acid-O-ethyl-O-[3-cyano-4,6-dimethyl-5-chloro-pyridyl-(2)]-ester.

Yield: 85% of the theory. Melting point 101° C.

Analysis.—Calculated for $C_{12}H_{16}ClN_2O_2PS$ (molecular weight 319): Cl, 11.13%; N, 8.79%; P, 9.72%; S, 10.06%; Found: Cl, 11.78%; N, 8.72%; P, 9.81%; S, 10.22.

EXAMPLE 14

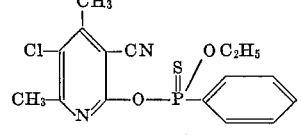

Phenylthionophosphonic-acid-O-ethyl-O-[3-cyano-4,6-dimethyl-5-chloro-pyridyl-(2)]-ester.

Yield: 69% of the theory. Melting point 95 to 97° C.

Analysis.—Calculated for $C_{16}H_{16}ClN_2O_2PS$ (molecular weight 367): Cl, 9.67%; N, 7.63%; P, 8.44%; S, 8.74%. Found: Cl, 9.75%; N, 7.66%; P, 8.20%; S, 8.93%.

The 2-hydroxy-3-cyano-4,6-dimethyl - 5-chloro-pyridine which is used as starting material in Examples 10 to 14 can be prepared for example as follows:

2-hydroxy-3-cyano-4,6-dimethylpyridine is reacted in glacial acetic acid at 70° C. with the equimolecular quantity chlorine in analogous manner as described in Example 9; an exothermic reaction occurs and the product is isolated by cooling the clear solution until crystallization. The yield of 2-hydroxy-3-cyano-4,6-dimethyl-5-chloro pyridine is 87% of the theory. The product melts at 275° C. with decomposition.

*Analysis.*—Calculated for $C_8H_7ClN_2O$ (molecular weight 182.6): Cl, 19.42%; N, 15.34%. Found: Cl, 18.88%; N, 15.10%.

The reaction of 2-hydroxy - 3 - cyano-4-carbethoxy-6-methylpyridine with the corresponding phosphoric-(phosphonic)- or thionophosphoric-(phosphonic)-acid ester chlorides analogous to Examples 1 to 4 yields the following compounds:

EXAMPLE 15

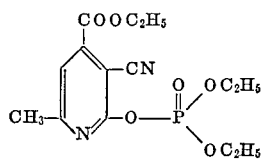

O,O-diethylphosphoric-acid - O-[3-cyano-4-carbethoxy-6-methyl-pyridyl-(2)]-ester.

Yield: 77% of the theory. Melting point 42° C.

*Analysis.*—Calculated for $C_{14}H_{19}N_2O_6P$ (molecular weight 342.3): P, 9.05%. Found: P, 8.95%.

EXAMPLE 16

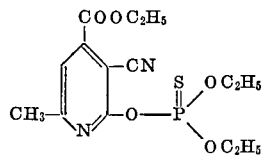

O,O - diethylthionophosphoric-acid - O - [3 - cyano - 4 - carbethoxy-6-methyl-pyridyl-(2)]-ester.

Yield: 82% of the theory. Melting point 91° C.

*Analysis.*—Calculated for $C_{14}H_{19}N_2O_5PS$ (molecular weight 358.4): N, 7.82%; P, 8.64%; S, 8.95%. Found: N, 7.67%; P, 8.90%; S, 9.44%.

EXAMPLE 17

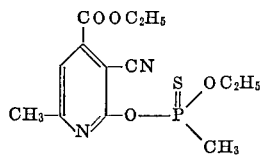

Methylthionphosphonic acid-O-ethyl-O-[3 - cyano - 4-carbethoxy-6-methyl-pyridyl-(2)]-ester.

Yield: 78% of the theory. Melting point 103° C.

*Analysis.*—Calculated for $C_{13}H_{17}N_2O_4PS$ (molecular weight 328.3): N, 8.54%; P, 9.43%; S, 9.77%. Found: N, 8.46%; P, 10.14%; S, 10.33%.

EXAMPLE 18

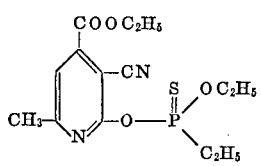

Ethylethionophosphonic acid - O - ethyl - O - [3-cyano-4-carbethoxy-6-methyl-pyridyl-(2)]-ester.

Yield: 98% of the theory. Melting point 77° C.

*Analysis.*—Calculated for $C_{14}H_{19}N_2O_4PS$ (molecular weight 342.4): N, 8.19%; P, 9.04%; S, 9.37%. Found: N, 8.21%; P, 9.44%; S, 9.78%.

EXAMPLE 19

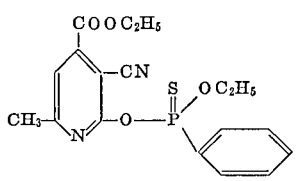

Phenylthionophosphoric acid - O - ethyl - O - [3-cyano-4-carbethoxy-6-methyl-pyridyl-(2)]-ester.

Yield: 46% of the theory. Melting point 113° C.

*Analysis.*—Calculated for $C_{18}H_{19}N_2O_4PS$ (molecular weight 390.4): P, 7.93%; S, 8.21%. Found: 8.31%; S, 8.69%.

The 2 - hydroxy-3-cyano-4-carbethoxy - 5 - bromo- or -chloro-6-methylpyridine obtained by bromination or chlorination of 2-hydroxy-3-cyano-4-carbethoxy - 6 - methyl-pyridine in the manner described above yield the following compounds after esterification analogous of Examples 1 to 4:

EXAMPLE 20

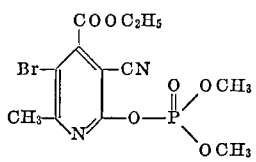

O,O - dimethylthionophosphoric acid - O - [3 - cyano-4-carbethoxy-5-bromo-6-methyl-pyridyl-(2)]-ester.

Yield: 47% of the theory. Melting point 74° C.

EXAMPLE 21

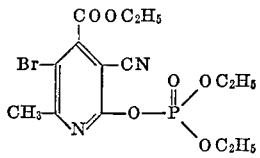

O,O - diethylphosphoric acid - O - [3 - cyano - 4 - carbethoxy-5-bromo-6-methyl-pyridyl-(2)]-ester.

Yield: 74% of the theory. Refractive index: $n_D^{24}=$ 1.5032.

*Analysis.*—Calculated for $C_{14}H_{18}BrN_2O_6P$ (molecular weight 421): N, 6.65%; P, 7.36%. Found: N, 6.52%; P, 8.12%.

EXAMPLE 22

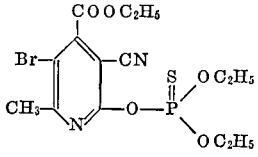

O,O - diethylthionophosphoric acid - O - [3 - cyano-4-carbethoxy-5-bromo-6-methyl-pyridyl-(2)]-ester.

Yield: 77% of the theory. Melting point: 39° C.

*Analysis.*—Calculated for $C_{14}H_{18}BrN_2O_5PS$ (molecular weight 437.3): Br, 18.28%; N, 6.41%; P, 7.09%; S, 7.33%. Found: Br, 17.63%; N, 6.42%; P, 7.16%; S, 7.68%.

EXAMPLE 23

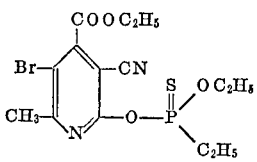

Ethylthionophosphonoic acid - O - ethyl - O - [3-cyano-4-carbethoxy-5-bromo-6-methyl-pyridyl-(2)]-ester.

Yield: 83% of theory. Melting point: 66° C.

*Analysis.*—Calculated for $C_{14}H_{18}BrN_2O_4PS$ (molecular weight 421): Br. 18.97%; N, 6.65%; P, 7.36%; S, 7.62%. Found: Br, 18.20%; N, 6.72%; P, 7.98%; S, 8.21%.

EXAMPLE 24

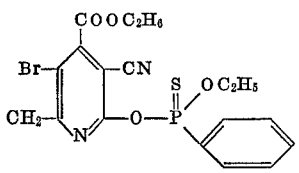

Phenylthionophosphonic acid - O - [3 - cyano - 4 - carbethoxy-5-bromo-6-methyl-pyridyl-(2)]-ester.

Yield: 44% of the theory. Melting point: 86–87° C.

Analysis.—Calculated for $C_{18}H_{18}BrN_2O_4PS$ (molecular weight 469.3): Br, 17.03%; N, 5.97%; P, 6.60%; S, 6.83%. Found: Br, 16.42%; N, 5.84%; P, 6.89%; S, 6.58%.

EXAMPLE 25

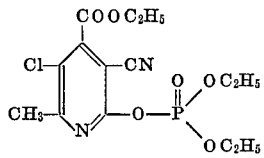

O,O - diethylphosphoric acid - O - [3 - cyano - 4 - carbethoxy-5-chloro-6-methyl-pyridyl-(2)]-ester.

Yield: 79% of theory. Refractive index: $n_D^{22}$=1.4948.

Analysis.—Calculated for $C_{14}H_{18}ClN_2O_6P$ (molecular weight 376.7): Cl, 9.42%; N, 7.44%; P, 8.22%. Found: Cl, 9.03%; N, 7.23%; P, 8.29%.

EXAMPLE 26

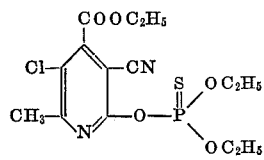

O,O-diethythionophosphoric acid - O - [3-cyano-4-carbethoxy-5-chloro-6-methyl-pyridyl-(2)]-ester.

Yield: 63% of the theory. Refractive index: $n_D^{22}$=1.5198.

Analysis.—Calculated for $C_{14}H_{18}ClN_2O_5PS$ (molecular weight 393): Cl, 9.03%; N, 7.13%; P, 7.89%. Found: Cl, 9.33%; N, 7.11%; P, 8.09%.

EXAMPLE 27

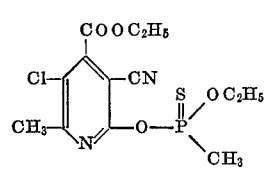

Methylthionophosphonic acid-O-ethyl-O-[3 - cyano-4-carbethoxy-5-chloro-6-methyl-pyridyl-(2)]-ester.

Yield: 54% of the theory. Refractive index $n_D^{22}$=1.5247.

EXAMPLE 28

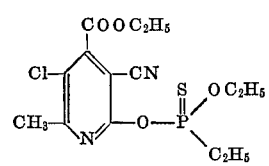

Etheylenethionophosphonic acid-O-ethyl-O-[3-cyano-4-carbethoxy-5-chloro-6-methyl-pyridyl-(2)]-ester.

Yield: 83% of the theory. Refractive index $n_D^{22}$=1.5306.

Analysis.—Calculated for $C_{14}H_{18}ClN_2O_4PS$ (molecular weight 377): Cl, 9.41%; N, 7.43%; P, 8.21%; S, 8.51%; Found: Cl, 9.38%; N, 7.10%; P, 8.58%; S, 8.85%.

EXAMPLE 29

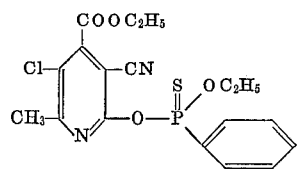

Phenylthionophosphonic acid-O-ethyl-O-[3 - cyano-4-carbethoxy-5-chloro-6-methyl-pyridyl-(2)]-ester.

Yield: 43% of the theory. Melting point: 71° C.

Analysis.—Calculated for $C_{18}H_{18}ClN_2O_4PS$ (molecular weight 425): Cl, 8.34%; N, 6.59%; P, 7.29%; S, 7.54%; Found: Cl, 8.23%; N, 6.25%; P, 7.64%; S, 7.92%.

EXAMPLE 30

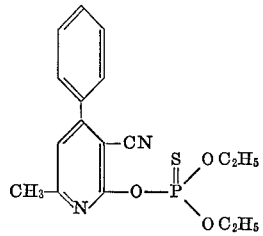

63 g. (0.3 mole) 2-hydroxy-3-cyano-4-phenyl-6-methyl-pyridine are suspended 150 ml. acetonitrile. The suspension is heated to 70° C. for 30 minutes together with 42 g. (0.3 mole) potassium carbonate; 58 g. (0.3 mole) O,O-diethylthionophosphoric-acid ester chloride are then added dropwise at about 50° C.

The mixture is then heated to 60 to 65° C. for 3 to 4 hours and subsequently stirred in the cold for another several hours. Finally, the reaction mixture is taken up in benzene, the solution is washed with dilute solution of caustic soda and water, the organic phase is dried and concentrated under reduced pressure. The remaining reaction product is recrystallized from a small quantity of a mixture of ether and petroleum-ether. The O,O-diethylthionophosphoric acid-O-[3-cyano - 4 - phenyl-6-methyl-pyridyl-(2)]-ester melts at 50° C. The yield is 50 g. (46% of the theory).

Analysis.—Calculated for $C_{17}H_{19}N_2O_3PS$ (molecular weight 362): N, 7.74%; P, 8.56%; S, 8.85%. Found: N, 7.70%; P, 8.24%; S, 8.39%.

The following compounds can be obtained in analogous manner as described in Example 30.

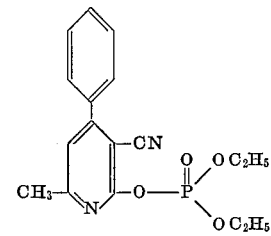

O,O-diethylphosphoric acid-O-[3-cyano-4-phenyl-6-methyl-pyridyl-(2)]-ester.

Yield: 27% of the theory. Melting point: 61° C.

Analysis.—Calculated for $C_{17}H_{19}N_2O_4P$ (molecular weight 346): N, 8.1%. Found: N, 8.07%.

EXAMPLE 32

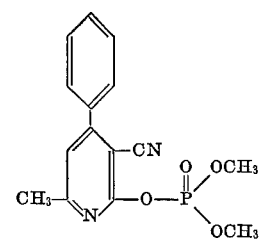

O,O - dimethylphosphoric acid-O-[3-cyano-4-methyl-6-methyl-pyridyl-(2)]-ester.

Yield: 24% of the theory. Melting point: 56–58° C.

*Analysis.*—Calculated for $C_{15}H_{15}N_2O_4P$ (molecular weight 318): N, 8.8%. Found: N, 8.59%.

EXAMPLE 33

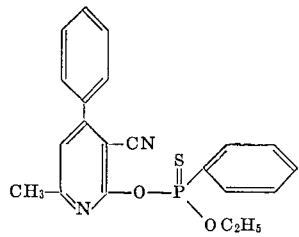

Phenylthionophosphonic acid - O - ethyl-O-[3-cyano-4-phenyl-6-methyl-pyridyl-(2)]-ester.

Yield: 42.5% of the theory. Melting point 108–110° C.

*Analysis.*—Calculated for $C_{21}H_{19}N_2O_2PS$ (molecular weight 394): N, 7.1%. Found: N, 7.05%.

EXAMPLE 34

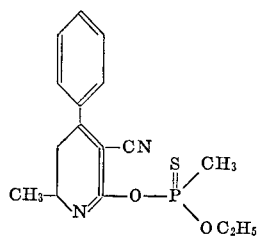

Methylthionophosphonic acid-O-ethyl-O-[3 - cyano-4-phenyl-6-methyl-pyridyl-(2-]-ester.

Yield: 28% of the theory. Melting point: 94–96° C.

*Analysis.*—Calculated for $C_{16}H_{17}N_2O_2PS$ (molecular weight 332): N, 84.%. Found: N, 8.41%.

EXAMPLE 35

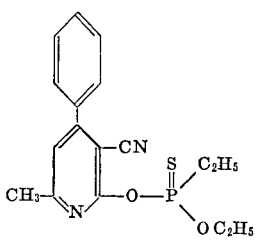

Ethylthionophosphonic acid-O-ethyl - O - [3-cyano-4-phenyl-6-methyl-pyridyl-(2)]-ester.

Yield: 59% of the theory. Melting point: 72° C. (from methanol)

*Analysis.*—Calculated for $C_{17}H_{19}N_2O_2PS$ (molecular weight 346: N, 8.1%; P, 8.96%; S, 9.26%. Found: N, 7.77%; P, 8.85%; S, 9.07%.

The 2-hydroxy-3-cyano-4-phenyl-6-methyl-pyridine used as starting material according to Examples 30 to 35 can be prepared for example as follows:

84 g. (1 mole) cyanoacetamide are dissolved in 400 ml. water and 100 ml. concentrated ammonia and the solution is mixed at 45° C. with a suspension of 160 g. (1 mole) benzoyl acetone in ethanol. The reaction is initiated by externally heating the reaction mixture with hot water. The benzoyl acetone dissolves and the reaction product precipitates soon, the temperature rising to 55° C. The mixture is allowed to cool. The precipitated product is filtered off with suction washed and dried. It melts at 260° C.

EXAMPLE 36

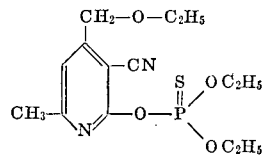

O,O-diethylthionophosphoric acid - O - [3 - cyano-4-ethoxymethyl-6-methyl-pyridyl-(2)]-ester.

Yield: 69 g. (68% of the theory). Melting point: 38–40° C.

*Analysis.*—Calculated for $C_{14}H_{21}N_2O_4PS$ (molecular weight 344.4): N, 8.13%; P, 8.99%; S, 9.31%. Found: N, 8.41%; P, 9.06%; S, 9.76%.

EXAMPLE 37

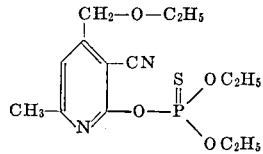

Ethylthionophosphoric acid-O-ethyl - O - [3-cyano-4-ethoxymethyl-6-methyl-pyridyl(2)]-ester.

Yield: 60 g. (61% of the theory). Melting point: 45–47° C.

*Analysis.*—Calculated for $C_{14}H_{21}N_2O_3PS$ (molecular weight 328.4): N, 8.53%; P, 9.43%; S, 9.77%. Found: N, 8.50%; P. 8.80%; S. 9.50%.

EXAMPLE 38

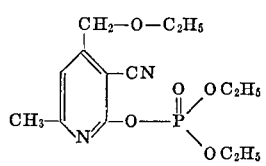

O,O-diethylphosphoric acid-O-[3-cyano-4-ethoxymethyl-6-methyl-pyridyl-(2)]-ester.

Yield: 76 g. (77% of the theory). Melting point: 46–48° C.

*Analysis.*—Calculated for $C_{14}H_{21}N_2O_5P$ (molecular weight 328.3): N, 8.53%; P, 9.43%. Found: N, 8.37%; P, 10.00%.

EXAMPLE 39

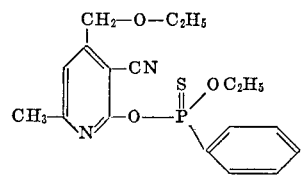

Phenylthionophosphonic acid-O-ethyl - O - [3-cyano-4-ethoxymethyl-6-methyl-pyridyl-(2)]-ester.

Yield: 44 g. (40% of the theory). Melting point: 69–71° C.

*Analysis.*—Calculated for $C_{18}H_{21}N_2O_3PS$ (molecular weight 376.4): N, 7.44%; P, 8.22%; S, 8.52. Found: N, 7.35%; P, 7.86%; S, 8.94%.

EXAMPLE 40

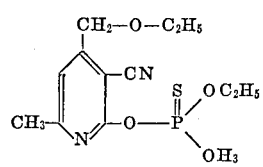

Methylthionophosphonic acid-O-ethyl - O - [3-cyano-4-ethoxymethyl-6-methyl-pyridyl-(2)]-ester.

Yield: 48 g. (51% of the theory). Melting point: 56–58° C.

Analysis.—Calculated for $C_{13}H_{19}N_2O_3PS$ (molecular weight 314.3): N, 8.91%; P, 9.85%; S, 10.20%. Found: N, 9.02%; P, 10.09%; S, 10.44%.

EXAMPLE 41

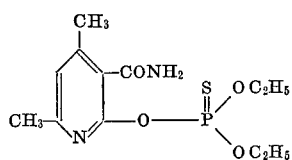

O,O-diethylthionophosphoric acid - O - [3-carbamyl-4,6-dimethyl-pyridyl-(2)]-ester.

Yield: 13 g. (14% of the theory). Melting point: 108° C.

Analysis.—Calculated for $C_{12}H_{19}N_2O_4PS$ (molecular weight 318.3): N, 8.80%; P, 9.73%; S, 10.06%. Found: N, 8.83%; P, 10.06%; S, 10.18%.

EXAMPLE 42

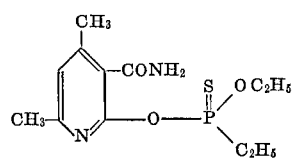

Ethylthionophosphonic acid-O-ethyl-O-[3-carbamyl-4,6-dimethylpridyl-(2)]-ester.

Yield: 26 g. (27% of the theory). Melting point: 106° C.

Analysis.—Calculated for $C_{12}H_{19}N_2O_3PS$ (molecular weight 302,3): N, 9.27%; P, 10.25%; S, 10.61%. Found: N, 9.68%; P, 9.52%; S, 10.95%.

What is claimed is:

1. A thionophosphonic acid ester having the formula

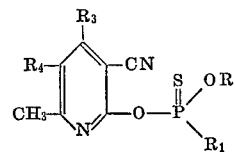

in which R is $C_1$-$C_4$ lower alkyl, $R_1$ is selected from the group consisting of methyl, ethyl, n-propyl and isopropyl, $R_3$ is selected from the group consisting of methoxymethyl, ethoxy-methyl, carbethoxy and methyl, and $R_4$ is selected from the group consisting of hydrogen, chlorine and bromine.

2. Ester according to claim 1 wherein such compound is an ester having the formula

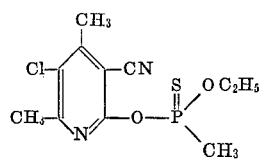

3. Ester according to claim 1 wherein such compound is an ester having the formula

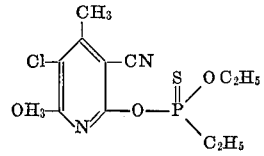

4. Ester according to claim 1 wherein such compound is an ester having the formula

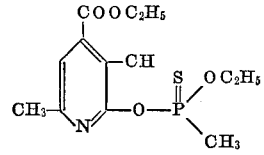

5. Ester according to claim 1 wherein such compound is an ester having the formula

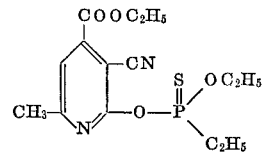

6. Ester according to claim 1 wherein such compound is an ester having the formula

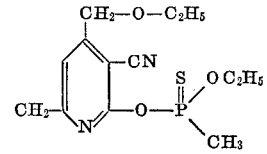

References Cited

Harvkawa: Chem. Abstracts, vol. 60, par. 2910, February 1964 (abstracting Japanese Pat. 13,079/63.

ALAN L. ROTMAN, Primary Examiner

U.S. Cl. X.R.

260—289, 294.9; 424—263, 266

PO-1050
(5/69)

UNITED STATES PATENT OFFICE
CERTIFICATE OF CORRECTION

Patent No. 3585205                          Dated June 15, 1971

Inventor(s) Karl-Julius Schmidt, Christa Fest, & Ingeborg Hammann

It is certified that error appears in the above-identified patent and that said Letters Patent are hereby corrected as shown below:

Col. 1, lines 16-17 (Abstract in Amendment of 8/13/70)

"2-hydroxy-3-cyano- and -3-carbamyl-pyridines which have cidal properties" should read -- 2-cyano-6- pyridines which possess insecticidal and acaracidal properties --;

line 27, (spec. p. 1, line 4)

"jyridines" should be -- pyridines --.

Col. 2, line 32 (Spec. p. 3, line 8)

change the period after "R" to a comma;

line 51 (spec. p. 4, line 2)

cancel "i.e. sulfuric acid" (2nd occurrence)

Col. 4, line 5 (spec. p. 7, line 5)

"(Rhodnius proiixus)" should be --(Rhodnius prolixus)--

36, (spec. p. 7, line 32)

"(Melolontha melolentha)" should be --(Melolontha melolontha)--

44, (spec. p. 8, line 3)

insert a comma after "domesticus"

UNITED STATES PATENT OFFICE
CERTIFICATE OF CORRECTION

Patent No. 3585205      Dated June 15, 1971

PAGE -2

Inventor(s) Karl-Julius Schmidt, Christa Fest & Ingeborg Hammann

It is certified that error appears in the above-identified patent and that said Letters Patent are hereby corrected as shown below:

Col. 4, line 44 (spec. p. 8, line 3)

Insert a hyphen between "sub" and "terranena"

line 46, (spec. p. 8, line 6)

insert -- as -- after "such"

line 58 (spec. p. 8, line 16)

"mite" should be -- mites -- line 59 (spec. p. 8, line 17)

cancel the period after "mite"

line 60 (spec. p. 8, line 18)

"urticate" should be -- urticae --

Col. 5, line 18 (spec. p. 9, line 16)

cancel the comma after "examples"

Col. 9, line 29 (spec. p. 17, line 5)
the connecting line in the diagram should be from "P" to "O"

Col. 11, line 75 (spec. p. 23, line 5)

insert a hyphen between "N" and "potassium"

UNITED STATES PATENT OFFICE
CERTIFICATE OF CORRECTION

Patent No. 3585205  Dated June 15, 1971

PAGE - 3

Inventor(s) Karl-Julius Schmidt, Christa Fest & Ingeborg Hammann

It is certified that error appears in the above-identified patent and that said Letters Patent are hereby corrected as shown below:

Col. 13, line 48 (spec. p. 27, line 2

"OH" in the Example should be -- CN --

Col. 15, line 70 (spec. p. 32, line 9)

"Ethylethionophosphonic" should be -- Ethylthionophosphonic --

Col. 16, line 10 (spec. p. 32, line 17

"Phenylthionophosphoric" should be -- Phenylthionophosphonic -- line 13 (spec. p. 33, line 4)

after "Found" insert -- P, -- line 19 (spec. p. 33, line 8)

Change "of" to -- to --;

line 25 (spec. p. 33, line 10)

$$\overset{O}{\underset{\|}{\text{"P"}}} \quad \text{should be} \quad -- \overset{S}{\underset{\|}{P}} -- \quad \text{(in example)}$$

line 50 (spec. p. 34, line 5)

$$\overset{S}{\underset{\|}{\text{"P"}}} \quad \text{should be} \quad --\overset{O}{\underset{\|}{P}} -- \quad \text{(in example)}$$

UNITED STATES PATENT OFFICE
CERTIFICATE OF CORRECTION

Patent No. 3585205  Dated June 15, 1971

Inventor(s) Karl-Julius Schmidt, Christa Fest & Ingeborg Hammann

It is certified that error appears in the above-identified patent and that said Letters Patent are hereby corrected as shown below:

Col. 16, line 70 (spec. p. 34, line 14)

"Ethylthionophosphonoic" should be -- Ethylthionophosphonic --

Col. 17, line 5 (spec. p. 35, line 2) (in the example)

"$CH_2$" should be -- $CH_3$ -- and "$COOC_2H_6$" should be -- $COOC_2H_5$ -- line 9 (spec. p. 35, line 3)

Insert after "acid-O"   -- ethyl-O --

Col. 20, line 22 (spec. p. 41, line 23)

the "$OC_2H_5$" in the lower portion should be -- $C_2H_5$ -- line 23 (spec. p. 42, line 1)

"Ethylthionophosphoric" should be -- Ethylthionophosphonic -- line 30 (spec. p. 42, line 7)

"8.80" should be -- 9.80 --

PO-1050
(5/69)

UNITED STATES PATENT OFFICE
CERTIFICATE OF CORRECTION

Patent No. 3585205        Dated June 15, 1971

PAGE - 5

Inventor(s) Karl-Julius Schmidt, Christa Fest & Ingeborg Hammann

It is certified that error appears in the above-identified patent and that said Letters Patent are hereby corrected as shown below:

Col. 20, line 71 (spec. p. 43, line 5)

the "$OH_3$" in the lower portion should be -- $CH_3$ --

Col. 22, line 15 (claim 5, now claim 3)

"$OH_3$" in the lower left hand should be -- $CH_3$ -- line 20 (Claim 6, now claim 4)

"CH"     should be -- CN -- line 40 (claim 8, now claim 6)

"$CH_2$" on lower left should be -- $CH_3$ --

Signed and sealed this 22nd day of February 1972.

(SEAL)
Attest:

EDWARD M. FLETCHER, JR.          ROBERT GOTTSCHALK
Attesting Officer                Commissioner of Patents